United States Patent [19]

Weber et al.

[11] Patent Number: 4,973,404
[45] Date of Patent: Nov. 27, 1990

[54] MICRO/ULTRA FILTRATION SYSTEM

[75] Inventors: Roland E. Weber, Indian Orchard; John J. Pavlovich, West Springfield, both of Mass.; Lawrence K. Wang, Latham, N.Y.

[73] Assignee: Aurian Corporation, Newton Lower Falls, Mass.

[21] Appl. No.: 403,109

[22] Filed: Sep. 5, 1989

[51] Int. Cl.[5] .............................................. B01D 37/02
[52] U.S. Cl. .................................... 210/193; 210/393; 210/411; 210/425; 210/427; 210/437; 210/446; 210/455; 210/457
[58] Field of Search ................ 210/348, 384, 391–393, 210/407, 409, 411, 412, 416.1, 417, 418–420, 425, 427, 428, 435, 437–446, 448–463, 777, 778, 193

[56] References Cited

U.S. PATENT DOCUMENTS

| | | |
|---|---|---|
| 3,422,958 | 1/1969 | Newman . |
| 3,488,768 | 1/1970 | Rigopulos . |
| 3,501,060 | 3/1970 | Pfeuffer . |
| 3,680,699 | 8/1972 | MacPherson . |
| 3,974,068 | 8/1976 | Ebner et al. . |
| 4,028,232 | 6/1977 | Wallis . |
| 4,187,174 | 2/1980 | Nielsen et al. . |
| 4,346,011 | 8/1982 | Brownstein . |
| 4,407,720 | 10/1983 | Bratten . |
| 4,427,554 | 1/1984 | Busse et al. . |
| 4,526,688 | 7/1985 | Schmidt, Jr. et al. . |
| 4,560,483 | 12/1985 | Warning et al. . |

*Primary Examiner*—Frank Sever
*Attorney, Agent, or Firm*—Nutter, McClennen & Fish

[57] ABSTRACT

A filtration apparatus characterized by efficiency of the precoating step and maintenance of filtration performance over a long period of time after precoating has been completed. The filter promotes parallel flow of porous precoat material along a porous septum, thereby achieving efficient stacking of this material against the septum. A dual-speed pumping system transmits the precoat material to the septum at high velocity, thereby further encouraging efficient stacking, but pumps the fluid to be filtered at a lower velocity to minimize energy consumption.

28 Claims, 7 Drawing Sheets

MICRO/ULTRA FILTRATION SYSTEM

BACKGROUND OF THE INVENTION

A. Field of the Invention

The present invention relates generally to the field of liquid filtration, and in particular to a precoat filter with enhanced efficacy and minimum loss of throughput.

B. Description of the Related Art

Water clarification, particle removal and wastewater treatment are presently performed by a number of different types of systems. These include chemical coagulation, chemical precipitation, flocculation, sedimentation, sand filtration (see, e.g., U.S. Pat. No. 3,680,699), chlorination, packed-bed ion exchange, packed-bed granular activated carbon, fluidized-bed granular activated carbon, alkaline neutralization, alkaline supplementation using soda ash, oxidation, aeration, single-stage precoat diatomaceous earth (DE) filtration, fabric screen filtration, metal screen filtration, membrane microfiltration, membrane ultrafiltration, reverse osmosis, electrodialysis, flotation and various biological processes.

In general, these systems suffer from high production cost, high operational cost, complexity, and/or unreliability. Furthermore, demanding federal and state standards for potable water prevent the use of many conventional filtration methods in drinking-water applications. Even non-potable wastewater treatment guidelines have become increasingly stringent, placing strains on the limits of current technology to deliver high filtration efficacy with acceptable throughput.

Mechanical methods of filtration typically operate by physical exclusion. The contaminated fluid is passed through a porous medium, which retains particles larger than the size of the pores but permits passage of the fluid effluent (containing particles smaller than the pores) therethrough. Decreasing the size of the pores improves the quality of the effluent, but at the expense of throughput; greater hydraulic capacity is necessary to force the same quantity of fluid per unit time through smaller pores. The pressure differential between the interior and exterior of the septum at a given hydraulic capacity, which represents the loss in hydraulic efficiency due to resistance of the filtration element, is known as head loss or pressure loss.

As used herein, "filter performance" denotes an evaluation of a given filter based on the size of the smallest particle that can be removed at a given throughput rate per unit of filter area using a given input pressure; "filtration efficacy" refers to the absolute size of the smallest particle that can be removed by a particular system at any operational pressure and throughput rate per unit of filter area. Because some distribution of filtrate particles is inevitable, a more common measure of efficacy is turbidity. This quantity reflects the cloudiness of the filtrate, and is typically expressed in nephelometric turbidity units (NTU) of visual clarity. Filtration to a turbidity level of 10-15 NTU is called microfiltration; achieving a level of no more than 1 NTU is called ultra-filtration.

It is well-known that depositing a bed of porous granular material along a porous solid support, or septum, will yield greater filter performance than that of the septum alone. The bed in effect adds a third dimension of filtration to the two-dimensional septum; however, because the granular material is itself porous in three dimensions, high degrees of filtration efficacy may be achieved with minimal loss of fluid throughput. In these systems, the principal function of the septum is retention of the granular material rather than actual filtration.

Prior to introduction of the contaminated fluid, the septum must be exposed to a slurry containing the granular material. This is known as the "precoat" step, and the granular portion of the slurry is referred to as the precoat material. This material should consist of particles having a distribution of sizes for optimum filtration. However, the septum pores should remain somewhat larger than the smallest precoat particles to reduce head loss. Retention of the precoat particles along a support having pores larger than some of these particles is typically accomplished by recirculating the precoat material through the support until the effluent appears relatively free of precoat material, indicating that the smaller particles have lodged behind the larger ones. This process consumes time and energy.

Because of its high porosity, DE is commonly used in precoat filtration systems. DE consists of extremely tiny fossil-like skeletons of microscopic aquatic plants called diatoms. Each skeleton is a highly porous framework of nearly pure silica, and may range from 0.5 to 100 microns in diameter. DE is available in different size distributions from a number of manufacturers. Other precoat media include adsorbents (e.g. activated carbons and synthetic polymeric adsorbents), cation exchangers and anion exchangers for dissolved impurities, and activated alumina.

Once filtration begins, solid contaminants that are removed from the fluid remain within the precoat layer. These deposits form a layer surrounding the precoat layer as filtration continues. Because the particles comprising this layer are not porous, the deposited layer resists passage of the fluid to a greater extent than the precoat layer, resulting in deterioration of filter performance over time. This deterioration can be forestalled by adding precoat material during the filtration process, a technique known as "body feeding." The body feed acts to distribute the solids embedded within the original precoat, thereby deterring buildup of an impervious layer. Of course, the fluid can be forced through the septum at a higher pressure to overcome the buildup of solids, but the increased head loss would require delivery of significantly more hydraulic energy to preserve throughput. As a practical matter, increasing input pressure requires expensive variable-speed pumping equipment.

Regardless of the ameliorative measures taken, a point will inevitably be reached at which fluid will be unable to pass through the septum with acceptable throughput characteristics relative to hydraulic energy input, necessitating removal of the solid contaminants and precoat layer from the septum. This "backwashing" step consumes time and energy, interrupts the filtration cycle, and requires a subsequent precoating procedure.

DESCRIPTION OF THE INVENTION

A. Summary of the Invention

The present invention provides a filtration apparatus characterized by efficiency of the precoating step and prolonged maintenance of filtration performance, thereby increasing the time between backwashes (the "cycle" time).

It has been found that efficient precoating may be obtained by (1) maximizing parallel flow of the slurry along the septum and (2) precoating at a high velocity relative to the normal flow rate. While not being bound by any particular mechanism or theory, it is believed that the combination of these two factors results in efficient stacking of precoat particles along the septum in a single pass, eliminating the need for recirculation. This is presumably due to the porous nature of DE and similar precoat materials.

While the mass/drag ratio of ordinary solid particles rises with particle size due to the predominance of increased volume displacement over increased surface area, the surface area of highly porous materials may actually increase at a faster rate than displaced volume as particle size grows larger. This results in a smaller mass/drag ratio for larger particles of such highly porous materials, rendering them more responsive to increases in the flow rate of the carrier medium. The buoyant effect of the carrier medium augments this responsiveness by reducing the effective weight of the particles, thereby reducing resistance to fluid flow due to gravity.

Thus, porous particles introduced as a batch into a flowing stream will separate according to size, so long as the flow tube is long enough with respect to fluid velocity to permit complete separation. Propelling a random distribution of different-size porous particles at high velocity over a sufficient distance results in a gradient distribution—with larger particles leading smaller ones—before the septum is reached. When these particles do reach the septum, a strong parallel flow along the length thereof enhances the particle-size gradient. The large particles, which encounter the septum housing first, are forced against the septum wall by perpendicular flow forces.

Parallel flow of fluid along a septum is largely determined by the overall mass flow rate and the spacing between the septum and surrounding housing, with smaller spacing improving parallel flow. By contrast, perpendicular flow into the septum is determined almost exclusively by the mass flow rate alone. Therefore, a high ratio of parallel to perpendicular flow will be produced by a small spacing between the septum and its housing. Parallel flow can also be influenced by such secondary factors as the size of the septum pores, the shape and diameter of the flow plug and flow collar mounted on opposite ends of the septum, and the initial velocity of the particles relative to septum height. This latter relationship is due to degradation of parallel flow with increasing flow distance. The present invention achieves efficient precoating without recirculation through design features that enhance parallel flow and high-velocity transmission of the precoat material to the septum.

In addition to enhanced performance, the present invention also facilitates a high degree of control over the level of filtration efficacy using a single septum pore size and precoat medium. Such control permits ready construction of modular precoat filtration systems, with each successive stage capable of removing smaller contaminant particles. Modular construction substantially increases filtration efficacy and throughput characteristics of the overall filter system when compared with a single stage in isolation. In the preferred embodiment of the invention, it has been found that throughput increases nearly linearly as additional modules are added, with little to no effect on cycle time.

It has also been found that moderately increasing hydraulic energy input during the filtration cycle results in improvement of filtration efficacy, although by definition filter performance decreases. Despite this decrease, the additional energy consumption may be favorable from an economic perspective for a limited amount of time, due to the fewer number of backwash operations necessary per unit time.

Alternatively, means for inducing vibration along the septum can be employed to rearrange the spacing between particles of the precoat material. At an optimal frequency, the rearrangement decreases head loss with minimal deterioration of filtration efficacy. A similar effect may be achieved by application of a high-pressure shock.

Other means of disturbing the precoat mat include introducing a small backpressure through the porous wall of the septum, or administering a momentary liquid jet stream tangential to the wall of the housing.

B. Brief Description of the Drawings

The foregoing discussion will be understood more readily from the following detailed description of the invention, when taken in conjunction with the accompanying drawings, in which:

FIG. 1 is a cut-away view of a filter incorporating the features of present invention;

FIGS. 2 and 3 respectively depict illustrative embodiments of top and bottom flow plugs designed to enhance parallel flow along a septum;

C. Detailed Description of the Invention

Figure 1:
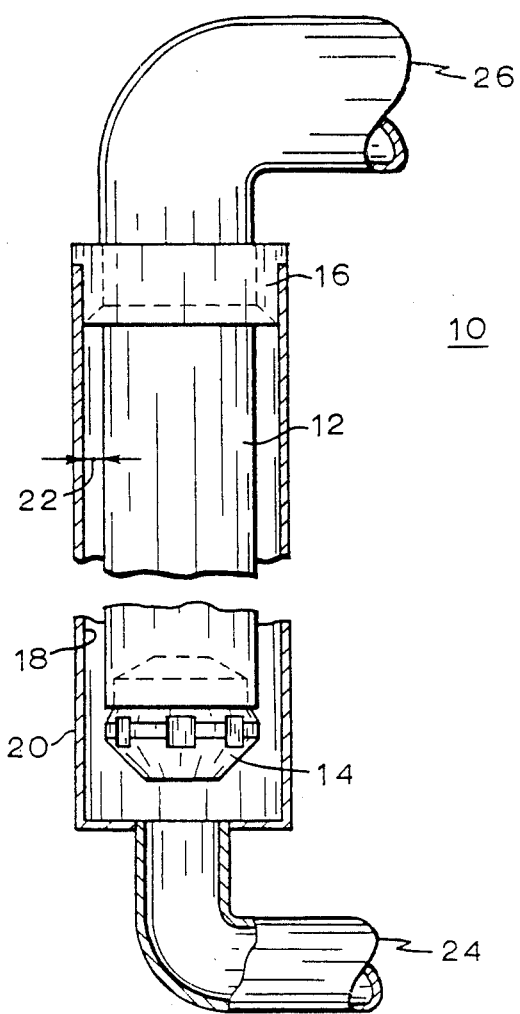

Referring to FIG. 1, reference numeral 10 denotes generally a filter constructed in accordance with the present invention. Porous septum 12 consists of a cylindrical tube manufactured from a corrosion-resistant material such as stainless steel and perforated throughout its length with pores. Alternatively, septum 12 may be fabricated from any of a number of ceramic-type materials amenable to manufacture with a controlled pore size. In the preferred embodiment, optimal filter performance has been found to occur with pores of 20 micron diameter using DE with an average particle diameter of 27 microns (such as that manufactured by Johns-Manville and sold under the trade name CEL-ITE #545). However, useful results have been obtained with different types and sizes of precoat materials using pore sizes ranging from 0.5 to 100 microns. Flow plug 14 and flow collar 16, described with greater particularity hereinbelow, should be configured so as to minimize vortex formation upon introduction of fluid through inlet 24.

The septum and flow plugs are contained within and secured to the top of stainless-steel vessel 20. The diameter of flow collar 16 is coextensive with the diameter of inner wall 18 of vessel 20, such that fluid may exit vessel 20 only after passing through the pores of septum 12. The space 22 between inner wall 18 and septum 12 should be as small as possible in order to promote fluid flow in the direction parallel, rather than perpendicular, to septum 12. In the preferred embodiment, the ratio of the annular area of space 22 to the cross-sectional area of the interior of septum 12 should be no greater than 1:3.

Figure 2:
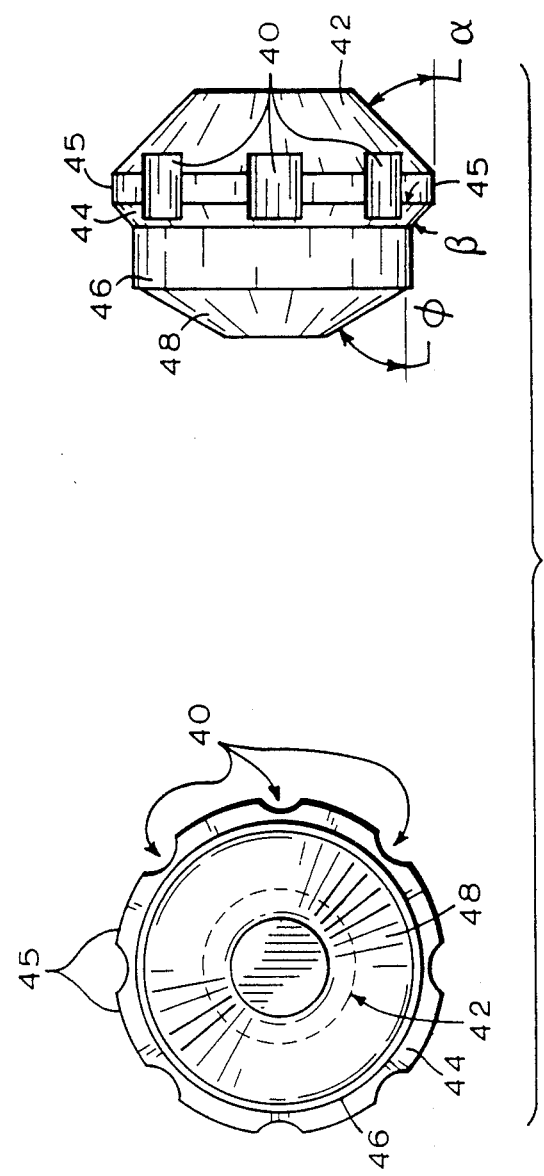
Figure 3:
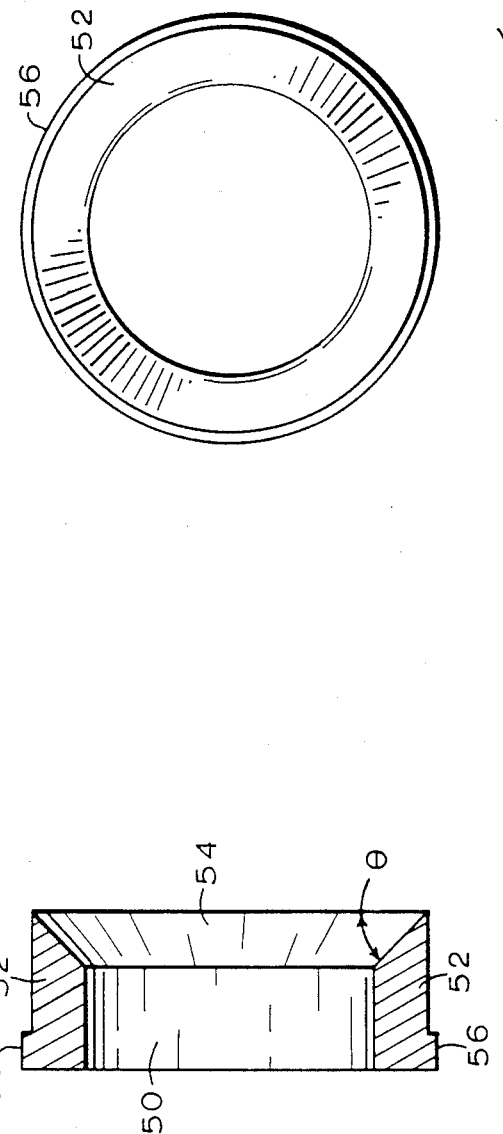

The preferred designs of the flow plugs are depicted in FIGS. 2 and 3. The bottom flow plug, illustrated in FIG. 2, consists of a single, solid member constructed of impervious material such as PVC or stainless steel. A series of concentric scalloped indentations 40, evenly spaced around the widest portion of the plug, edge 45, promote parallel flow of liquid along the length of the septum and reduce vortex formation. The depth of indentations 40 and the spacing between edge 45 and inner wall 18 are not critical, but should be chosen so as to permit laminar flow. Outer portion 42, which encounters the flow of liquid entering the vessel, is of a truncated conical configuration with apex angle $\alpha$ of approximately 45°. The plug narrows along segment 44 before reaching segment 46, which actually engages the septum. Segment 44 is also shaped as a truncated cone, and also with apex angle $\beta$ of 45°. The diameter of segment 46 is roughly equal to the inner diameter of the septum, such that a seal is formed when segment 46 is inserted therein. Inner segment 48 is likewise of a truncated conical configuration with apex angle $\phi$ of about 60°. This latter segment lessens turbulence as fluid flows into the bottom portion of the septum and directs backwash flow.

Figure 4:
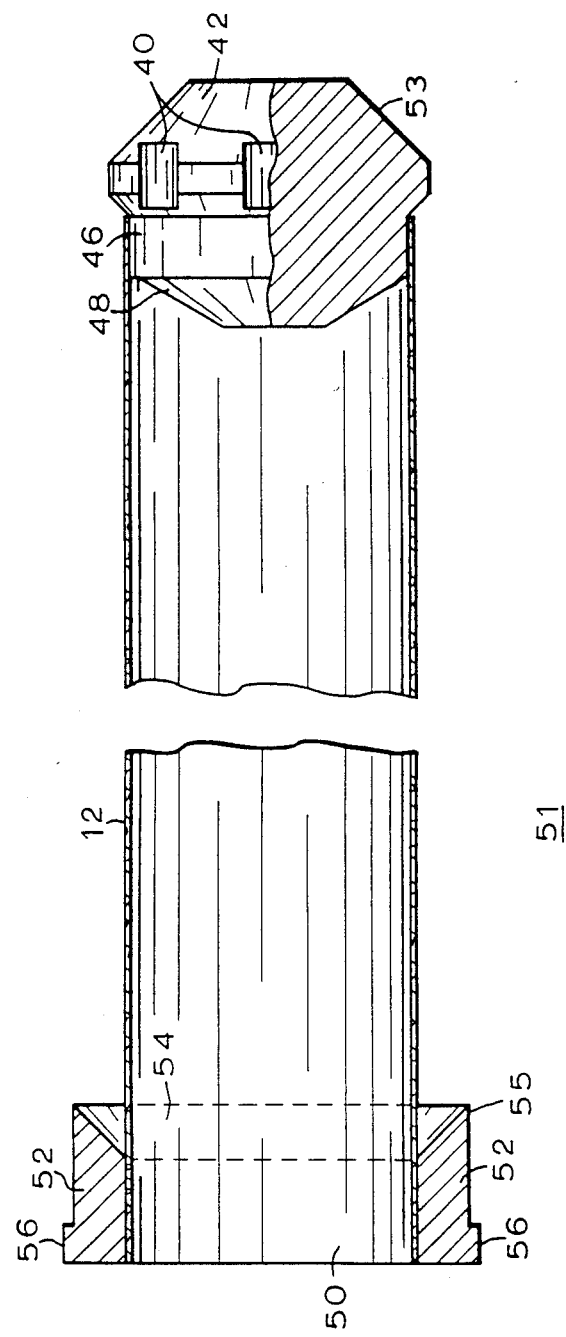
FIG. 4 is a view of a septum assembly containing both top and bottom flow plugs.

FIG. 3 illustrates a preferred design for the flow collar, which also consists of a single member constructed of impervious material such as PVC or stainless steel. The configuration consists of a generally annular structure surrounding hollow area 50, which admits the septum. After insertion, the septum remains in intimate contact with the inner side of wall 52, as illustrated in FIG. 4. The inner side of wall 52 is tapered along its lower edge 54 to the outer side of wall 52, with an angle of taper $\theta$ of approximately 45°. The outer side of wall 52 rests against the vessel holding the septum. Upper lip 56 secures the flow collar to the top side of the vessel containing the septum assembly. Therefore, it is preferable to have upper lip 56 protrude a distance beyond wall 52 equal to the thickness of the vessel wall.

FIG. 4 depicts the manner in which flow collar 55 and bottom flow plug 53 are engaged to septum 12 to form a septum assembly, denoted generally by reference numeral 51. Segment 46 of bottom flow plug 53 is inserted within septum 12, the diameter of segment 46 being substantially equal to the diameter of the inner wall of septum 12 such that intimate contact is promoted therebetween. The other end of septum 12 is inserted within flow collar 55, the diameter of the outer wall of septum 12 being substantially equal to the diameter of the inner side of wall 52, such that intimate contact is promoted therebetween. In the preferred embodiment, the ratio of the height of septum 12 to its inner diameter is approximately 7:1.

Returning to FIG. 1, operation of the present invention begins with introduction of the precoat slurry through inlet 24 at high velocity; the velocity will be sufficiently high if it is at least 10 ft/sec entering the filter. The slurry encounters bottom flow plug 14, which encourages parallel flow along septum 12. Flow collar 16 minimizes turbulence by directing fluid flow at the top of vessel 20 into septum 12. As the precoat material is being deposited by this flow pattern, the fluid component of the slurry passes through septum 12 and exits through outlet 26. It has been found that inherent system backpressure is minimized by keeping the cross-sectional area of outlet 26 at least 60% greater than the cross-sectional area of inlet 24.

In a series modular system, outlet 26 would lead to the inlet of the next filter element, and so on. In a parallel modular system, inlet 24 would lead to a common line engaging the inlets of the other filter elements, and outlet 26 would lead to a second common line engaging the outlets of the other filter elements.

One means of precoating the septum of each element of a series modular system simultaneously utilizes a set of individual pumps, each of which engage a single filter element through a valve that can be closed during operation. This permits different precoat materials to be used on each successive septum. In a parallel modular system, a single pump can feed all elements from the common inlet line.

It is also possible to pass the effluent emerging from outlet 26 through an ultraviolet light unit prior to discharge; this final stage is useful in applications where disinfection of the effluent from pathogenic microorganisms is desired.

In backwash mode, liquid is forced through outlet 26 and outward through the pores of septum 12, thereby dislodging accumulated precoat material and contaminant. Discharge occurs through inlet 24.

Figure 5:
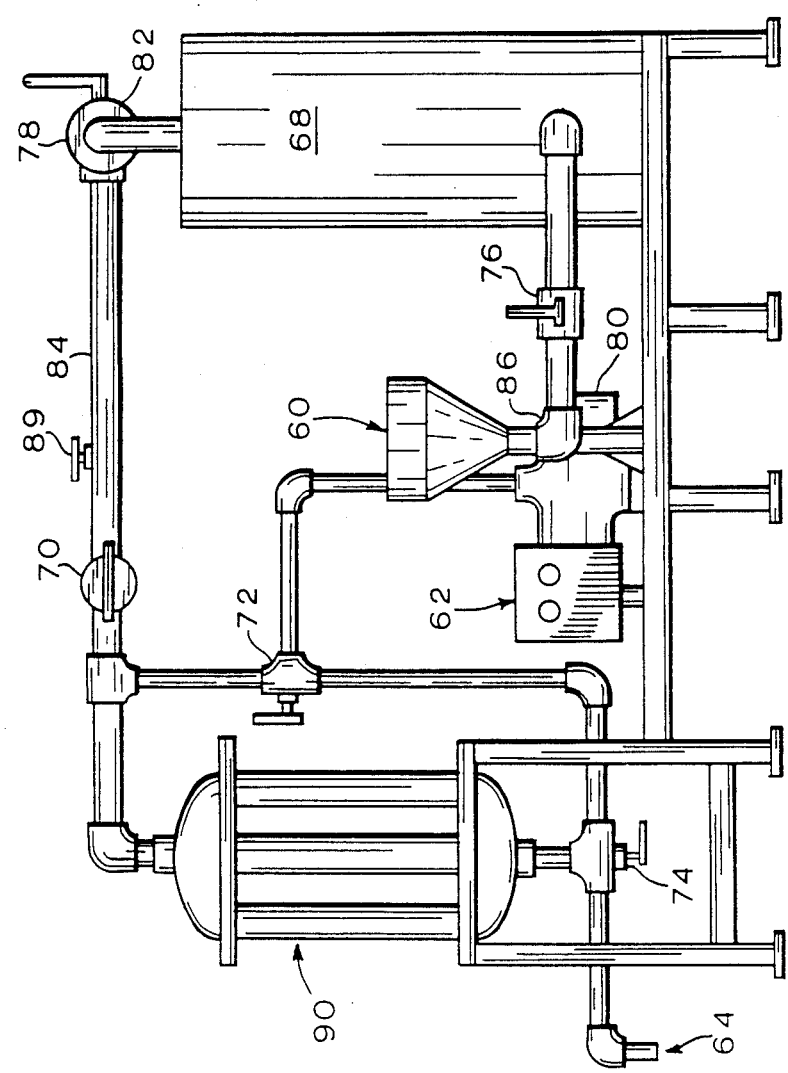
FIG. 5 is a view of a modular filtration system utilizing filter elements constructed in accordance with the present invention.
Figure 6:
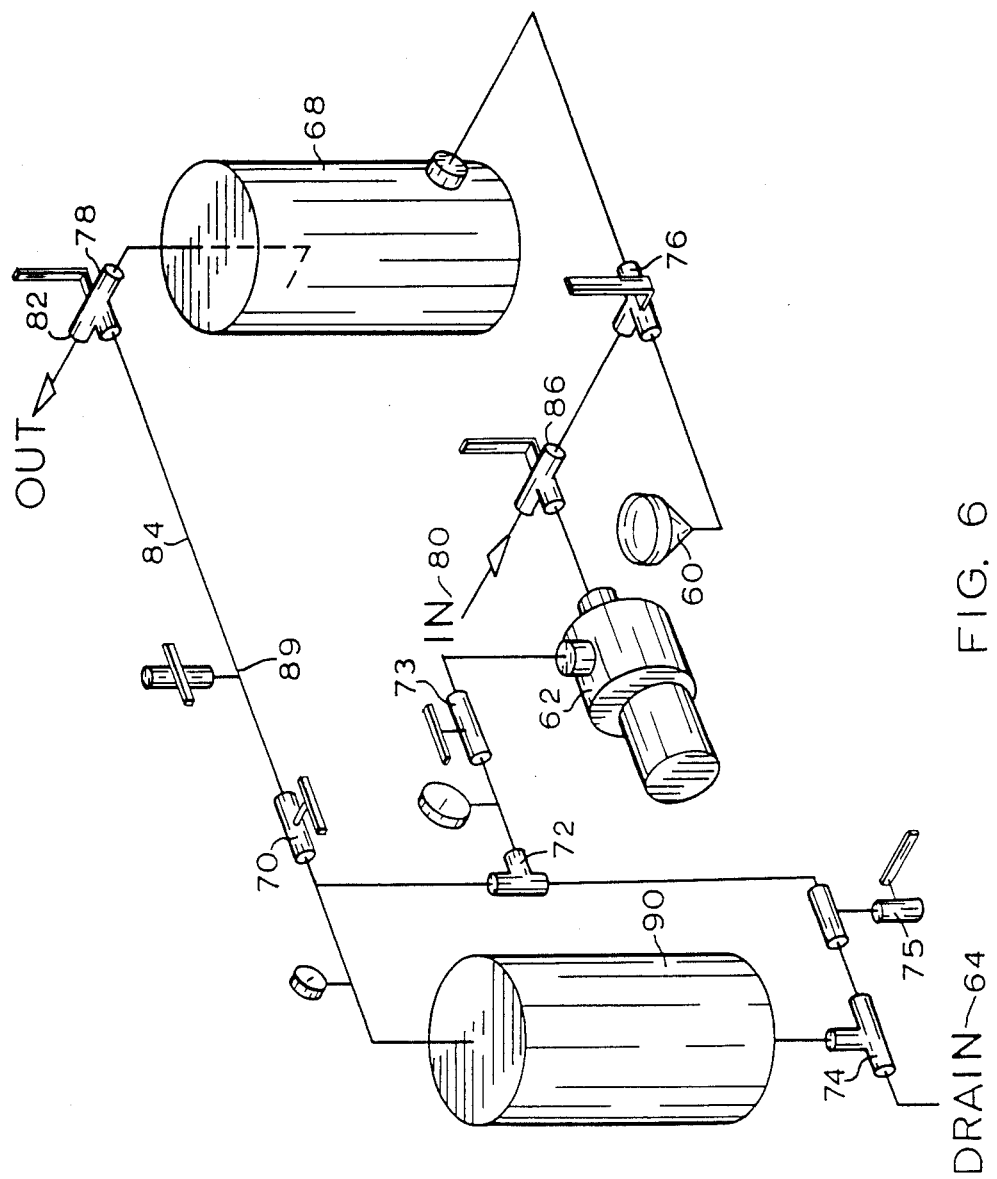
FIG. 6 is a schematic view of the filtration system depicted in FIG. 5.

FIGS. 5 and 6 illustrate a complete filtration system constructed in accordance with the present invention; the following reference numerals refer to both Figures. Prior to the precoat step, a measured amount of precoat material is introduced into funnel 60 and combined with liquid carrier to form a slurry. Also prior to precoating, a sufficient quantity of liquid to facilitate the precoating operation should be introduced into tank 68 and the desired amount of precoat slurry poured into funnel 60. In order to initiate precoating, mixing valve 76 is opened with respect to funnel 60, thereby permitting funnel 60 to communicate with the line leading to dual-speed pump 62. Inlet valve 86 is closed to inlet 80, valve 73 is opened, valve 72 is set downwardly, valve 75 is opened, valve 74 is set so as to close access to drain 64, valve 70 is opened and valve 78 is set so as to direct flow into tank 68. Pump 62 is turned on at its high-pressure setting, thereby producing a vacuum in funnel 60 that withdraws the measured quantity of precoat slurry therefrom and introduces it into main filter 90. As discussed hereinabove, introduction of a single batch of precoat material is necessary to permit formation of the particle size gradient. In order to avoid undue introduction of air into the system after the precoat slurry has been withdrawn from funnel 60, a ball check valve can be added thereto.

The liquid carrier proceeds along line 84 and is ejected through valve 78 into tank 68. If clean or filtered liquid is unavailable for the precoating step, the design of the system permits use of the contaminated liquid that will eventually be the subject of filtration. In this case, the liquid is recirculated through the system after precoating has taken place, resulting in accumulation of progressively cleaner water in tank 68.

The system depicted in FIG. 5 is a multi-element parallel system; therefore, valve 74 leads to a common inlet line into all filter elements, and outlet line 84 similarly accepts discharge from all filter elements.

Pump 62 can be any of several types, so long as it offers the necessary velocity differential between the two speeds. A two-stage pump produces the best efficiency characteristics. Alternatively, a single-stage pump equipped with a throttling valve can be employed, but throttling down such pumps to reduce speed typically results in little difference in energy utilization as compared with the higher speed. A third possibility is a "constant flow" pump, wherein a continuous rate of flow is maintained over a range of pressures. This type of pump can be used so long as it is powerful enough to deliver a sufficiently high velocity flow at the initial stage relative to the normal flow rate to be used during the filtration cycle.

Filtration may be commenced after precoating has been completed. Contaminated material is introduced into the system through inlet valve 86, which is opened with respect to inlet 80. Because no recirculation is required, the filter effluent is discharged through line 84 and valve 70, which is opened with respect to outlet 82. Pump 62 is turned to its lowpressure setting, and the contaminated material flows into filter 90.

Because pump 62 offers two pressure settings, the higher setting may be engaged when head loss in main filter 90 becomes severe. It has been found that with the precoat material having been deposited as described hereinabove, no loss in filtration efficacy is observed.

Backwashing can be accomplished by application of hydraulic pressure or an explosive compressed air reaction. Because the system of the present invention can be fabricated from materials capable of withstanding high pressures, rapid and efficient backwashing is permitted.

To utilize hydraulic pressure, valve 76 is closed with respect to funnel 60, valve 86 is closed with respect to inlet 80, valve 73 is fully opened, valve 72 is directed upward, valve 70 is closed, and valve 74 is directed leftward to open access to drain 64. When pump 62 is turned on, fluid is released from tank 68 and fed through main filter 90 in the direction opposite that of normal flow. This flow mechanically dislodges accumulated precoat material and filtered contaminant from the septa of the elements of main filter 90; these are ejected along with backwash fluid through drain 64. Tank 68 can be replenished through inlet 80 with valve 78 set to admit fluid into tank 68.

To utilize explosive compressed air, a small amount of the liquid in the filter is drained by turning off pump 62, and opening valves 70 and 74, and air inlet valve 89. Valves 70, 74 and 89 are closed after draining is complete. Pump 62 is then turned back on (with valve 73 still fully open), resulting in pressure buildup along the inner septum wall. When drain valve 74 is opened, this pressure is suddenly released, resulting in removal of the precoat mat from the outer septum wall.

Figure 7:
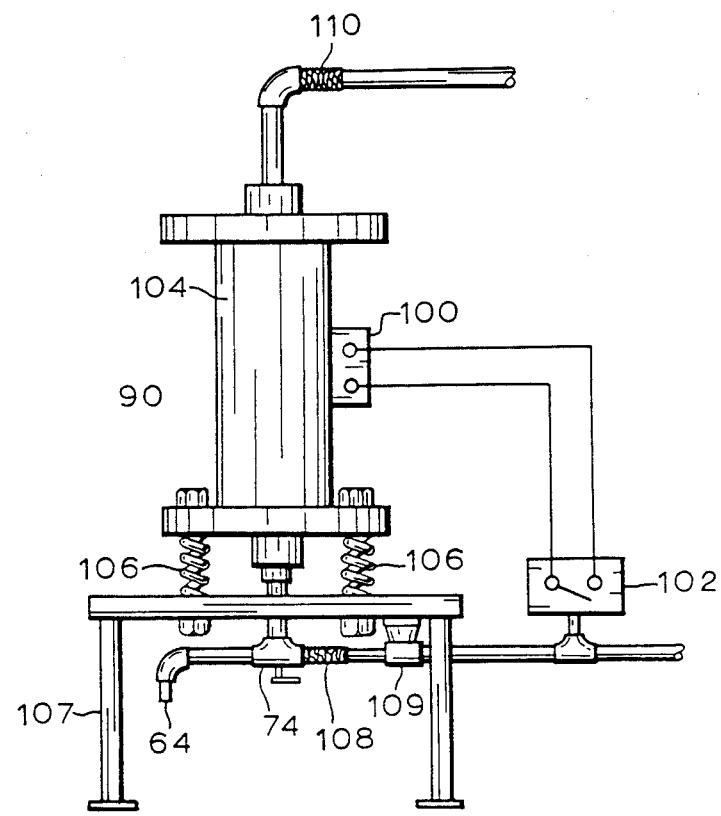
FIG. 7 depicts a modified version of the main filter chamber, which has been adapted for use with vibrator means.

The main filter apparatus may also be reconfigured in the manner depicted in FIG. 7, in order to permit introduction of a controlled means of vibration. At a properly chosen amplitude and frequency, controlled vibration will rearrange the spacing between accumulated precoat and filtered particles—thereby decreasing head loss—without deterioration of filtration efficacy. Vibrator unit 100 is firmly engaged to the filter element or, in the case of a modular system, to a hollow cylinder 104 surrounding and in contact with all of the elements in the filter. Vibrator means 100 can take a number of forms, as are well-known in the art, such as a rotating flywheel-and-offset assembly wherein the offset either periodically strikes cylinder 104 as the assembly rotates, or induces vibration in the drive motor which is mechanically attached to hollow cylinder 104. Vibrator means 100 may be actuated manually or by means of pressure switch 102, which engages when the backpressure caused by buildup of contaminant on the septum reduces throughput below the desired level.

Main filter 90 is mounted on a plurality of compression springs 106 that absorb the vibration before it is transmitted to support 107. Flexible tubing 108 replaces part of the line leading from valve 74 to the pump, which is clamped to support 107 by clamp 109; flexible tubing 110 replaces part of the line leading from the outlet of main filter 90; both sections of flexible tubing function to absorb vibration.

Experimentation with the single-stage unit has revealed a range of optimum vibration frequencies and amplitudes. With frequency of 20 Hz or more and a peak-to-peak mechanical dislocation amplitude of at least 30 mils, filter cycle time was increased with no loss of filtration efficacy. The combination of 20 Hz at 4 mils decreased the size of the smallest particle removed by about 10%, but also decreased the flow rate. It does not appear to matter whether vibration is applied continuously or intermittently.

Another way in which particles can be rearranged to restore flow rate is to balance pressures across the septum. Normally, a pressure differential exists across the inner and outer walls of the septum due to the combined resistance to flow of the precoat material and the septum pores; this pressure differential assures adherence of the precoat mat to the outer septum wall, thereby reducing compression of the precoat mat and enhancing permeability. By closing and quickly reopening valve 70 during filtration, backpressure is introduced into the septum body and against the inner septum wall. This backpressure causes the precoat to rearrange itself advantageously. The necessary pressure differential is reestablished when valve 70 is reopened. Alternatively, cycle time can be increased by partially closing valve 70 when flow begins to decrease (thereby creating backpressure across the septum), and leaving it in this position through the remainder of the filter cycle. Either technique can increase cycle time by as much as 50%.

A third mechanism for rearranging the precoat particles comprises introduction of a tangential liquid jet system into the filter housing. Referring to FIG. 1, a hollow rod containing a series of vertically aligned openings may be inserted through flow collar 16 and into space 22. The openings should be pointed so as to direct a stream of fluid passing through the rod (and out through the openings) in a direction substantially tangential to the outer wall of septum 12. The stream of fluid causes turbulence which dislodges the particles in the precoat mat, thereby increasing the mat's permeability.

Finally, it has been found that introduction of heat into the contaminated fluid can serve to reduce viscosity and decrease the required retention time of polymers along the precoat mat. A variety of heating arrangements may be added to the basic system to perform this function.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:
1. A precoat filter element comprising:
 a. a vessel having an inner wall;
 b. inlet means for admitting fluid into said vessel;

c. outlet means for discharging fluid out of said vessel;
d. a porous septum disposed in the flow path between said inlet means and said outlet means, a wall of said septum having a predetermined spacing from the inner wall to form therebetween a chamber communicating with said inlet means;
e. means for providing, for a fluid containing porous particles of various sizes and passing through said chamber, a ratio of velocity parallel to said septum wall to velocity perpendicular to said septum wall sufficient to cause larger porous particles contained within said fluid to reach said outer wall prior to smaller porous particles contained within said fluid; and
f. means for communicating with a pump for pumping fluid through said chamber.

2. The filter element of claim 1 wherein the spacing between the outer wall of said septum and the inner wall of said vessel is sufficiently large to retain adequate fluid throughput through said element.

3. The filter element of claim 1 wherein the spacing between the outer wall of said septum and the inner wall of said vessel is such that the ratio of the area thereof to the cross-sectional area of the interior of said septum is no greater than 1:3.

4. The filter element of claim 1 wherein the ratio of the height of said septum to the inner diameter thereof is approximately 7:1.

5. The filter element of claim 1 wherein the cross-sectional area of said outlet means is at least 60% greater than the cross-sectional area of said inlet means.

6. The filter element of claim 1 wherein the diameter of the pores of said septum is approximately 20 microns.

7. The filter element of claim 1 wherein the diameter of the pores of said septum is at least 0.5 micron.

8. The filter element of claim 1 further comprising a flow plug secured to each end of said septum.

9. The filter element of claim 1 further comprising pumping means capable of delivering fluid to said inlet means at one of at least two flow rates.

10. The filter element of claim 9 wherein at least one velocity is at least 10 ft/sec.

11. A filtration system comprising at least one filter element according to claim 1, and further comprising vibrator means.

12. The filtration system of claim 11 further comprising means for reducing the pressure difference between the inside of the septum and the outside of the septum.

13. The filtration system of claim 11 further comprising means for introducing fluid in a direction tangential to the outer wall of said septum.

14. The filtration system of claim 11 further comprising heating means.

15. A percent filter element comprising:
a. a vessel having an inner wall;
b. inlet means for discharging fluid into said vessel;
c. outlet means for discharging fluid out of said vessel;
d. a porous septum disposed in the flow path between said inlet means and said outlet means; and
e. means for communicating with a pump for pumping fluid through said chamber, said communication means being of sufficient length to facilitate separation, by flowing stream of particles introduced at the pump end of said communication means prior to entry of said particles into said vessel.

16. The filter element of claim 15 wherein the spacing between the outer wall of said septum and the inner wall of said vessel is sufficiently large to retain adequate fluid throughput through said element.

17. The filter element of claim 15 wherein the spacing between the outer wall of said septum and the inner wall of said vessel is such that the ratio of the area thereof to the cross-sectional area of the interior of said septum is no greater than 1:3.

18. The filter element of claim 15 wherein the ratio of the height of said septum to the inner diameter thereof is approximately 7:1.

19. The filter element of claim 15 wherein the cross-sectional area of said outlet means is at least 60% greater than the cross-sectional area of said inlet means.

20. The filter element of claim 15 wherein the diameter of the pores of said septum is approximately 20 microns.

21. The filter element of claim 15 wherein the diameter of the pores of said septum is at least 0.5 micron.

22. The filter element of claim 15 further comprising a flow plug secured to each end of said septum.

23. The filter element of claim 15 further comprising a pump capable of delivering fluid to said inlet means at one of at least two velocities.

24. The filter element of claim 23 wherein at least one velocity is at least 10 ft/sec.

25. A filtration system comprising at least one filter element according to claim 15, and further comprising vibrator means.

26. The filtration system of claim 25 further comprising means for reducing the pressure difference between the inside of the septum and the outside of the septum.

27. The filtration system of claim 25 further comprising means for introducing fluid in a direction tangential to the outer wall of said septum.

28. The filtration system of claim 25 further comprising heating means.

* * * * *